Jan. 9, 1934.  N. W. CUMMINGS  1,943,207
LIQUID LEVEL GAUGE
Filed Oct. 29, 1928
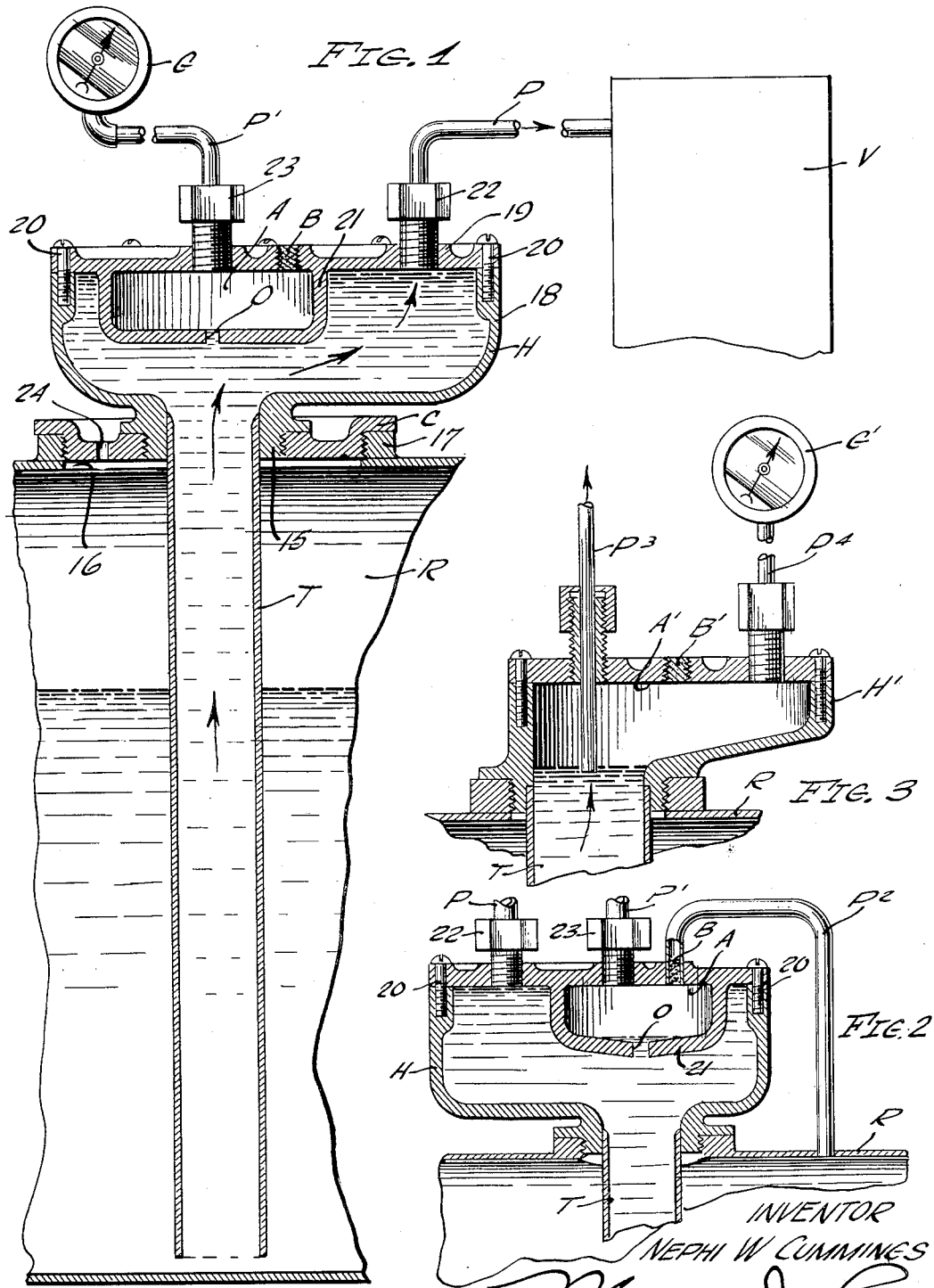
INVENTOR
NEPHI W. CUMMINGS
BY Nunn & Co.
ATTORNEYS Patented Jan. 9, 1934

1,943,207

UNITED STATES PATENT OFFICE 1,943,207

LIQUID LEVEL GAUGE

Nephi W. Cummings, San Bernardino, Calif.

Application October 29, 1928. Serial No. 315,852

6 Claims. (Cl. 73—54)

My invention relates to liquid level gauges and has for a purpose the provision of a gauge which measures the pressure at a fixed point in a conduit through which liquid is discharged upward from a tank or other source, the conduit being associated with the tank so that the pressure at the fixed point decreases directly as the level of liquid in the tank decreases, whereby with a suitable instrument connected to the conduit at the fixed point, the level of liquid in the tank is indicated.

It is also a purpose of my invention to render such a gauge applicable to gasoline supply tanks for automobile engines where the gasoline is induced by pressure or suction to flow to the carburetor, and in this adaptation to render the gauge immune to variations in velocity flow of gasoline by reason of variations in intensity of suction or pressure, so that the gauge will accurately indicate the level of gasoline in the tank.

I will describe only three forms of liquid level gauges embodying my invention and will then point out the novel features in claims.

In the accompanying drawing:

Figure 1 is a view showing in vertical section one form of liquid level gauge embodying my invention in applied position to the supply tank and vacuum tank of a fuel feeding system; and Figs. 2 and 3 are views similar to Fig. 1 showing a modified form of liquid fuel gauge embodying my invention.

Similar reference characters refer to similar parts in each of the several views.

The embodiment of my invention illustrated in Fig. 1 is shown applied to a liquid reservoir or tank R, and to a region of relatively low pressure such as a gasoline pump V. The gauge shown in Fig. 1 comprises a tube T having a predetermined cross-sectional area for a purpose to be described hereinafter and of such length as to extend downwardly from the top of the tank to a point adjacent the bottom thereof. It is welded or otherwise secured at its upper end to a collar 15, and the collar is threaded in a cap C constituting a closure for an opening 16 in the top of the tank. Around the opening is secured a collar 17 in which the cap C is threaded. The collar 15 carries a head H which is in communication with the upper end of the tube T. The head H is cylindrical with the collar 15 at one side of the center of the head. The head consists of a body 18 closed at its top side by a cover 19 removably secured thereto by screws 20. The cover 19 carries a depending partition 21 constructed to provide a chamber A disposed concentrically with respect to the tube T. The bottom of the chamber is provided with a port O which provides communication between the chamber and the head body 18.

A fitting 22 is provided for connecting a pipe P to the body 18, and this pipe extends to the gasoline pump V. A second fitting 23 connects a pipe P' to the chamber A and to a pressure gauge G. That portion of the cover 19 constituting the top of the chamber A is provided with a threaded plug B constructed of suitable porous material in order that it may provide an air leak to permit the restricted flow of air into the chamber A. The cap C is provided with a vent port 24 in order that the liquid in the tank R may be subjected to atmospheric pressure.

The operation of the gauge is as follows:

With the gasoline pump in operation, liquid from the tank R is caused to flow upwardly of the tube T and outwardly of the pipe P. For all practical purposes it may be assumed that whenever the liquid is thus flowing, the pressure at the port O will be completely determined by the pressure on the surface of the liquid in the tank R, the density of the liquid and the distance between the port O and the surface or level of liquid in the tank. If the air pressure in the chamber A is greater than the pressure at the port O, then air will flow out of the chamber through the port until the pressures are equalized. If in any way the pressure in the chamber should become less than the liquid pressure at the port, then liquid will flow into the chamber. Owing to the flat shape of the chamber, a relatively large volume of liquid can flow into the chamber without building up a very great depth. This volume of liquid will compress the air in the chamber until the pressures are equalized.

From the foregoing, it will be understood that without the porous plug B or an equivalent air leak, then filling the tank R might produce a flux of sufficient liquid into the chamber A to build up an appreciable depth so that the air pressure in the chamber would not be equal to the pressure at the port O. This condition would be likely to occur during low temperatures in which event it would persist until either the reservoir is drained or the temperature raised. With the plug B, however, such a condition can be only momentary because air from the atmosphere will leak into the chamber driving out the liquid. If the temperature of the pipe P' drops, the pressure therein will decrease. If there is no such leak in the system as is provided by the plug B, then this decrease in pressure will cause liquid to rise in the chamber A, so that the pressure in the tube P' will no longer be the pressure at the port O, but will be this pressure diminished by the pressure due to the liquid above port O. In case the pressure in the tank is greater than atmospheric, such as in automobiles with pressure feed, the plug B should be connected to the upper part of the tank by a pipe P², as illustrated in Fig. 2, in order to have a pressure sufficient to drive air through the plug. The bottom part of the partition 21 may be slightly conical as illustrated in Fig. 2, so as to permit the bubbles to escape readily.

It will be thus seen that except for a brief period after filling of the tank R or after a sudden temperature drop, the pressure within the chamber A must be the same as at the port O. In addition to maintaining this equalization of pressures, the plug B alone, or in conjunction with the pipe P², prevents vapors from passing into the pipe P' and ultimately condensing, causing the pressure gauge to give false indications.

Since equalization of pressures within the chamber A and at the port O is maintained, then for all practical purposes the difference between the pressure in the chamber A and the pressure on the liquid surface in the tank R completely determines the distance between this surface and the port O, so long as the density of the liquid does not change. But since the port O is fixed in position, the distance thus determined is itself a true indication of the depth of liquid in the tank, for the depth of liquid is the difference between this variable distance and the constant distance from the bottom of the tank to the port O. If, therefore, the gauge G is constructed to measure this pressure difference, then it will measure the depth of liquid in the tank and can be calibrated in depth units or volume units. If the surface of the liquid in the tank is subject to atmospheric pressure, then an ordinary pressure gauge will suffice.

To render my gauge immune to variations in velocity of flow of the liquid therethrough, I take advantage of the fact that it is practicable to reduce the velocity to such a value as to prevent such variations of velocity as must inevitably occur from interfering with the satisfactory operation of the gauge. I accomplish this result by designing the tube T of sufficiently large cross-section that the linear speed of the liquid therethrough is relatively low and such that it causes no appreciable variation in liquid pressure at the port O and hence no appreciable error in the reading given by the gauge G.

Although my instrument is useful for many purposes, it is especially valuable for indicating the quantity of gasoline in the supply tank of an automobile. If the tube T has a cross-section of ten square centimeters (which is not excessive), then a linear speed of one centimeter per second will correspond to a flow rate of thirty-six liters per hour, which is about as fast as any gasoline system ever feeds. With a tube as large as this, the effect of viscosity will also be negligible.

Referring to Fig. 3, I have here shown another form of liquid level gauge embodying my invention which, in point of operation, is substantially the same as that of the gauge shown in Fig. 1. However, in this form of my invention, the head on the upper end of the tube, here designated at H', is constructed to provide an air chamber indicated at A', without the necessity of employing a partition 21 as in Fig. 1. A pipe P³ is extended downwardly through the top of the head H' with its inner end terminating substantially flush with the bottom of the chamber A', and this pipe is adapted for connection to a region of relatively low pressure such, for example, as the gasoline pump shown in Fig. 1. A pipe P⁴ communicates with the top of the chamber A' at one side of the tube T and laterally of the pipe P³, and this pipe P⁴ is connected to the pressure gauge G'. The cover of the head H' is similarly provided with a porous plug B', which is designed to function in the same manner as the plug B.

In operation, liquid is drawn out of the tube T into the pipe P³, thereby maintaining the air pressure in the upper part of the tube T equal to the liquid pressure at the lower end of pipe P³. As this pressure varies in accordance with the level of liquid in the tank R, it will be clear that the gauge will indicate the depth of the liquid in the tank.

Although I have herein shown and described only three forms of liquid level gauges embodying my invention, it is to be understood that various changes and modifications may be made herein without departing from the spirit of the invention and the spirit and scope of the appended claims.

I claim:

1. In a liquid level gauge, the combination of a liquid reservoir, a tube leading upward from a level near the bottom of the reservoir, communicating at its lower end with the reservoir, and having a sufficiently large cross section to make the error due to the velocity in liquid flow in the tube negligible, a pipe adapted for communication with a region of relatively low pressure, an enclosure above the upper portion of the tube having a wall provided with a port, a chamber at the upper portion of the tube extending below the enclosure and communicating with the said enclosure through said port and communicating with said pipe, said enclosure having a wall provided with a passage through which air can pass slowly and communicating with the reservoir so as to maintain the air at the outer end of the passage at practically the same pressure as that at the liquid level in the reservoir, and a pressure gauge having means whereby it may communicate with the said enclosure.

2. A liquid level gauge comprising a tube adapted to be extended downwardly into a liquid reservoir so that its lower end is near the bottom of and in communication with the reservoir, a body at the upper end of the tube, a pipe communicating with the top of the body and laterally of the tube and adapted for connection to a region of relatively low pressure for inducing a flow of liquid from the reservoir upwardly of the tube and outwardly of the pipe, a partition in the body defining a chamber and having a port which establishes communication between the chamber and the remainder of the body, an element providing a slow leak for air into the chamber to equalize the pressures in the chamber and at the port, a pressure gauge, a pipe connecting said gauge to the chamber.

3. A liquid level gauge comprising a tube adapted to be extended downwardly into a liquid reservoir so that its lower end is near the bottom of and in communication with the reservoir, a body at the upper end of the tube, a pipe communicating with the top of the body and adapted for connection to a region of relatively low pressure for inducing a flow of liquid from the reservoir upwardly of the tube and outwardly of the pipe, a partition in the body defining a chamber and having a port which establishes communication between the chamber and the remainder of the body, means in one wall of the body for precluding accumulation of appreciable quantities of liquid in the chamber, and a pressure gauge including a pipe connected to said chamber.

4. In combination, a source of liquid supply, means for producing a relatively low pressure for withdrawing liquid from the source of liquid supply, means providing a flow path between said source and said low pressure producing means, an enclosure for the accommodation of air or other gas therein, means for producing in the neighborhood of a definite point in the flow path a surface of contact between the liquid and the air or other gas in the enclosure, means for causing said surface of contact to be small relatively to the cross sectional area of the enclosure, means co-operable with the enclosure for indicating variations in pressure, means for causing the pressure in the enclosure plus the liquid density multiplied by the distance between the surface of contact and the liquid level at said source to be equal to the pressure at said liquid level, the last means comprising an element through which air may leak slowly, means for connecting one side of said element to said enclosure, and means for continuously applying to the other side of said element a pressure substantially equal to that exerted on the surface of the liquid at the source of liquid supply.

5. In a liquid level gauge, the combination with a reservoir, of a tube adapted to extend downwardly therein to a point adjacent to the bottom thereof, an enclosure above the upper end of the tube adapted to contain air or other gas, means forming a flow path for the liquid, means for producing in the neighborhood of a definite point in the flow path a surface of contact between the liquid and the air or other gas contained in the enclosure, means for causing the surface of contact to be small relatively to the cross sectional area of the enclosure, a piezometer, a pipe establishing communication between the piezometer and the enclosure so that variations in pressure may be determined by said piezometer, means provided at the reservoir adapted to be exposed to atmospheric pressure, and an element carried by the enclosure through which air from the atmosphere may pass slowly into the enclosure.

6. In a liquid level gauge, the combination with a reservoir, of a tube adapted to extend downward therein to a point adjacent to the bottom thereof, an enclosure above the upper end of the tube adapted to contain air or other gas, means forming a flow path for the liquid, means for producing in the neighborhood of a definite point in the flow path a surface of contact between the liquid and the air or other gas contained in the enclosure, means for causing the surface of contact to be small relatively to the cross sectional area of the enclosure, a piezometer, a pipe establishing communication between the piezometer and the enclosure so that variations in pressure may be determined by said piezometer, and an element at the enclosure through which air may pass slowly into the enclosure, the aforementioned means forming a flow path for the liquid including a chamber communicating with the enclosure at the bottom thereof, and a means for establishing communication between the chamber and a region of low pressure.

NEPHI W. CUMMINGS.